US008799716B2

(12) United States Patent
Jalaldeen et al.

(10) Patent No.: US 8,799,716 B2
(45) Date of Patent: Aug. 5, 2014

(54) HEAP DUMP OCCURRENCE DETECTION

(75) Inventors: Ahamed Jalaldeen, Bangalore (IN); Ashish Mungi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/352,749

(22) Filed: Jan. 18, 2012

(65) Prior Publication Data

US 2013/0185602 A1 Jul. 18, 2013

(51) Int. Cl.
*G06F 11/00* (2006.01)
(52) U.S. Cl.
USPC .................. 714/38.11; 714/45; 714/48
(58) Field of Classification Search
None
See application file for complete search history.

(56) References Cited

U.S. PATENT DOCUMENTS

| | | | |
|---|---|---|---|
| 6,594,774 B1 * | 7/2003 | Chapman et al. ................. | 714/2 |
| 6,643,802 B1 * | 11/2003 | Frost et al. ...................... | 714/37 |
| 7,320,125 B2 | 1/2008 | Elliott et al. | |
| 8,166,349 B2 * | 4/2012 | Cota-Robles et al. .......... | 714/45 |
| 2008/0040407 A1 | 2/2008 | Ge et al. | |
| 2009/0063651 A1 * | 3/2009 | Brahmavar ................... | 709/212 |
| 2009/0172409 A1 | 7/2009 | Bullis et al. | |
| 2009/0193181 A1 * | 7/2009 | Sugino .......................... | 711/103 |
| 2009/0254999 A1 | 10/2009 | Julin et al. | |
| 2009/0300424 A1 * | 12/2009 | Kojima .......................... | 714/39 |
| 2010/0192132 A1 * | 7/2010 | Yuan et al. ..................... | 717/128 |
| 2010/0287352 A1 | 11/2010 | Chapman et al. | |
| 2010/0332914 A1 * | 12/2010 | Ueba .............................. | 714/48 |
| 2011/0067007 A1 | 3/2011 | Zamarreno | |
| 2011/0161956 A1 | 6/2011 | Vennam et al. | |
| 2011/0231710 A1 * | 9/2011 | Laor ........................... | 714/38.11 |
| 2012/0151278 A1 * | 6/2012 | Tsantilis ........................ | 714/48 |

OTHER PUBLICATIONS

Huang et al. "Optimizing Crash Dump in Virtualized Environments", VEE '10 Proceedings, Mar. 17-19, 2010, Pittsburg, PA.
Kovari et al. "Problem Determination Across Multiple WebSphere Products AIX Platform", IBM Redbooks, Apr. 2004.
"Generating System Core Dump, Java Core Dump, Heap Dump and a Snap Dump When WebSphere Application Server Community Edition is Running as an Operating System Service", IBM, Sep. 5, 2011.
"Force or Generate JVM Core Dump [Closed]", http://stackoverflow.com/questions/5576672/force-or-generate-jvm-core-dump.

(Continued)

*Primary Examiner* — Gabriel Chu
(74) *Attorney, Agent, or Firm* — Ronald A. Kaschak, Esq.; Matthew M. Hulihan, Esq.; Heslin Rothenberg Farley & Mesiti P.C.

(57) ABSTRACT

Detection of heap dump occurrence is facilitated through maintenance of a heap dump location registry. The heap dump location registry indicates tools for which heap dump occurrence is to be detected. Based on periodically referencing the heap dump location registry, it is determined whether heap dump of a tool of the one or more tools has occurred. In one embodiment, startup and shutdown events of the tool are tracked to update execution status and process identifiers in the heap dump location registry, and the periodically references determines based on the indicators whether heap dump has occurred for the tool. In another embodiment, a heap dump location for heap dumps of the tool is obtained from the registry and the heap dump location is checked for the presence of heap dump files, which presence indicates occurrence of a heap dump for the tool.

20 Claims, 7 Drawing Sheets

(56) References Cited

OTHER PUBLICATIONS

"Tivoli Composite Application Manager for Application Diagnostics," http://www-01.ibm.com/software/tivoli/products/composite-application-mgr-diagnostics/, Jan. 2012, pp. 1-3.

"Tivoli Monitoring," http://www-01.ibm.com/software/tivoli/products/monitor, Jan. 2012, pp. 1-4.

"JVMMon Java Virtual Machine MONitoring system," http://www.mobilab.uniua.it/JVMMon.htm, Jan. 2012, pp. 1-2.

"FileNet System Monitor," http://www-01.ibm.com/software/data/content-management/filenet-system-monitor/, Jan. 2012, pp. 1-2.

"JVM command-line options," http://publib.boulder.ibm.com/infocenter/javasdk/v6r0/index.jsp?topic=%2Fcom.ibm.java.doc.diagnostics.60%2Fdiag%2Fappendixes%2Fcmdline%2Fcommands_jvm.html, Jan. 2012, pp. 1-10.

"Environment variables and Javadump," http://publib.boulder.ibm.com/infocenter/javasdk/v6r0/index.jsp?topic=%2Fcom.ibm.java.doc.diagnostics.60%2Fdiag%2Ftools%2Fjavadump_env.html, Jan. 2012, pp. 1.

* cited by examiner

| Product / Tool | Location | PID | Execution Status ? | Java Heap Dump Occurrence ? |
|---|---|---|---|---|
| Eclipse Platform | C:\Eclipse | nnnn | True / False | True / False |
| WebSphere Business Modeler | C:\Program Files\IBM\WBModeler | nnnn | True / False | True / False |
| InfoSphere Data Architect | C:\Program Files\IBM\SDP\_IDA | nnnn | True / False | True / False |
| Rational Software Architect | C:\Program Files\IBM\SDP\_RSA | nnnn | True / False | True / False |
| Rational Application Developer | C:\Program Files\IBM\SDP\_RAD | nnnn | True / False | True / False |
| WebSphere Integration Developer | C:\Program Files\IBM\WID | nnnn | True / False | True / False |

FIG. 2

HEAP DUMP OCCURRENCE DETECTION

BACKGROUND

Upon abnormal termination (colloquially known as a "crash") of an executing program, the working memory of that program may be recorded to a nonvolatile storage, for instance, in an action referred to as a memory dump. The memory dump results in a typically large amount of data stored in one or a few files, which embodies the state of the program and/or the system at the time of the crash, and which can later be analyzed for debugging purposes. In the case of an operating system, the memory dump is referred to as a core dump, while in the case of an executing application, such as a Java based tool, the dump is referred to as a heap dump or Java core dump.

In the case of some execution environments, such as a Java Virtual Machine (JVM), a crash generates a heap dump which is written to a particular location of the file system. When several Java based tools are installed on a computer, the heap dump files thereof are generated in multiple different locations. This makes dealing with heap dump of multiple tools, and/or detecting occurrence thereof, difficult.

BRIEF SUMMARY OF THE INVENTION

The shortcomings of the prior art are overcome and additional advantages are provided through the provision of a method which includes: maintaining, by a processor, a heap dump location registry, the heap dump location registry indicating one or more tools for which heap dump occurrence is to be detected and comprising one or more registrations of one or more heap dump locations for heap dumps of the one or more tools, and subsequent to occurrence of a heap dump of a tool of the one or more tools, detecting occurrence of the heap dump of the tool, the detecting including periodically referencing the heap dump location registry and determining, based on the referencing, whether the heap dump has occurred for that tool.

In a further aspect, a computer system is provided which includes a memory and a processor, in communications with the memory. The computer system is configured to perform a method which includes: maintaining a heap dump location registry, the heap dump location registry indicating one or more tools for which heap dump occurrence is to be detected and comprising one or more registrations of one or more heap dump locations for heap dumps of the one or more tools, and subsequent to occurrence of a heap dump of a tool of the one or more tools, detecting occurrence of the heap dump of the tool, the detecting including periodically referencing the heap dump location registry and determining, based on the referencing, whether the heap dump has occurred for that tool.

In yet a further aspect, A computer program product is provided which includes at least one non-transitory medium readable by a processor and storing instructions for execution by a processor to perform a method which includes: maintaining a heap dump location registry, the heap dump location registry indicating one or more tools for which heap dump occurrence is to be detected and comprising registrations of heap dump locations for heap dumps of the one or more tools, and subsequent to occurrence of a heap dump of a tool of the one or more tools, detecting occurrence of the heap dump of the tool, the detecting including periodically referencing the heap dump location registry and determining, based on the referencing, whether the heap dump has occurred for that tool.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts one example of a heap dump location registry, in accordance with one or more aspects of the present invention;

DETAILED DESCRIPTION

Abnormal termination of an application program running on an execution environment such as Java Virtual Machine can be difficult to detect. In some cases, a user may be unaware of a crash by the executing tool (also referred to herein as a Java-based tool, product, program, or application) and associated heap dump of the tool until long after the crash occurs. Furthermore, detection is made even more difficult because of the fact that different tools typically have different heap dump locations to which their heap dumps are written. When heap dump occurrences go undetected, the heap dump files, which may be of no use to the user, might remain on the storage medium (e.g. hard drive) indefinitely, thereby potentially consuming valuable storage space. Some approaches to detecting occurrence of a heap dump for a tool include manual browsing (e.g. by a users) and inspection of the specific heap dump locations, and/or an extensive file system search using a known file pattern of heap dump files. However, both of these approaches are time-consuming and prone to error, for instance in the case that a user navigates through incorrect file locations or if files having a similar file pattern to that of the heap dump file(s) are mistakenly deleted. Additionally, in the case of a file system search, it can detrimentally reduce performance of the computer system.

Disclosed herein is a method, system, and computer program product to facilitate detecting occurrences of heap dumps of tools executing on a computer system, which can advantageously facilitate, for instance, timely cleanup (e.g. deletion) and/or other handling of heap dump files.

Figure 1:
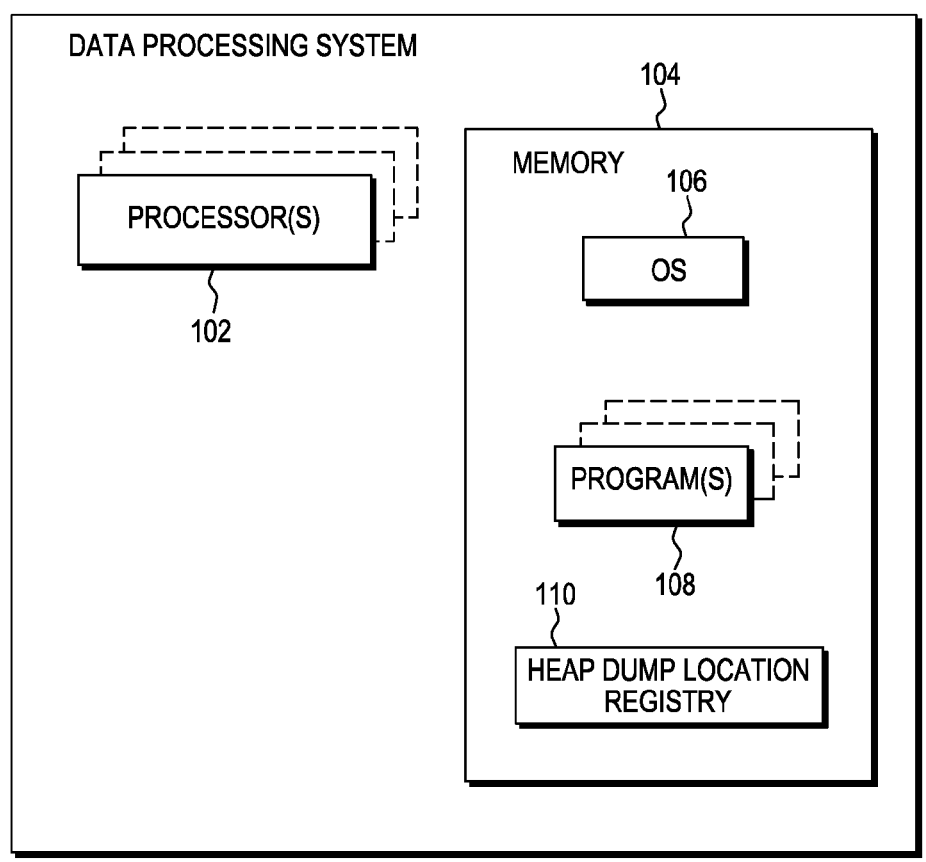
FIG. 1 depicts one embodiment of a data processing system to incorporate and use one of more aspects of the present invention.

FIG. 1 depicts one example of a data processing system to incorporate and use one or more aspects of the present invention. In one embodiment, data processing system may be based, for instance, on Intel Corporation's x86 architecture, or the xSeries® or pSeries® architectures offered by International Business Machines Corporation, Armonk, N.Y. (xSeries® and pSeries® are registered trademarks of International Business Machines Corporation, Armonk, N.Y.).

In FIG. 1, data processing system 100 includes one or more processor(s) 102 in communication with a memory 104 via one or more communications links (i.e. busses; not pictured). A non-limiting list of examples of memory 104 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Processor(s) 102 obtain from memory 104 one or more instructions for execution by the processors. In this example, processor(s) 102 execute an operating system 106 and one or more program(s) 108, which comprises, in this example, program code stored in memory 104.

Memory 104 also includes a heap dump location registry 110, which is maintained by the system as explained in further detail below.

It should be understood that while FIG. 1 depicts a single data processing system to incorporate and use one or more aspects of the present invention, multiple data processing systems may be provided for facilitating aspects of the present invention. For instance, functions of data processing system 100, described in connection with FIGS. 3-6 and elsewhere herein, can be implemented in a computing environment that comprises multiple data processing systems, for instance each specializing in an assigned function or functions, as will be appreciated by those having ordinary skill in the art.

Various facilities to enable aspects of the present invention are described and depicted herein with reference to Java-based tools executing on data processing system 100. (JAVA is a trademark of Oracle Corporation (or its affiliates), Redwood Shores, Calif.). One example of a Java based tool is the Rational® Software Architect offered by International Business Machines Corporation, Armonk, N.Y. (Rational® is a registered trademark of International Business Machines Corporation, Armonk, N.Y.). Java-based tools are used herein only by way of specific example, and the scope of the present invention is not limited in this regard. Java-based tools are only one example of the types of programs for which heap dump occurrence detection is provided, and those having ordinary skill in the art will recognize that aspects of the present invention are equally applicable to programs other than Java-based programs.

Those having ordinary skill in the art will additionally recognize that a heap dump, such as a Java tool heap dump, is different from an operating system core dump. An operating system creates a core dump based on the occurrence of errors in a program executed by the operating system directly. A heap dump created by, for instance, a Java Virtual Machine, results from the occurrence of errors in a Java program executed by the Java Virtual Machine. Additionally, aspects of the present invention are distinguishable from heap dump analysis tools, such as a "HeapAnalyzer", offered by International Business Machines Corporation, Armonk, N.Y., which are directed to the analysis of heap dump files after heap dump occurs.

In accordance with one or more aspects of the present invention, heap dump occurrence detection is provided to detect heap dumps of programs 108 (e.g. Java products/tools) executing on data processing system 100. A heap dump location registry is maintained by the data processing system, wherein execution status of the Java tools is tracked, and wherein heap dump occurrence is verified via file pattern checking of heap dump locations. The heap dump location registry can be referenced periodically in order to determine whether heap dump has occurred for one or more tools executing on the Java Virtual Machine. Heap dump occurrence detection can help to avoid heap dump file proliferation and promote better utilization of storage space.

FIG. 2 depicts one example of a heap dump location registry, in accordance with one or more aspects of the present invention. Registry 200 includes a plurality of entries 202a through 202f, with each entry corresponding to a different product/tool for which heap dump occurrence is being detected. Each tool is indicated by a Product/Tool name 204. In FIG. 2, heap dump occurrence is being detected for six different tools, entitled "Eclipse Platform" (ECLIPSE is a trademark of The Eclipse Foundation (or its affiliates), Ottawa, Ontario, Canada), "WebSphere® Business Modeler", "InfoSphere® Data Architect", "Rational® Software Architect", "Rational® Application Developer", and "WebSphere® Integration Developer" (WebSphere®, InfoSphere®, and Rational® are registered trademarks of International Business Machines Corporation, Armonk, N.Y.). Further, each tool has an associated heap dump location 206 for heap dumps of the tool. The heap dump location for each tool is registered in the registry, and more specifically in the appropriate entry corresponding to the respective tool. Different tools will typically (though not always; e.g.: Eclipse shell) have different heap dump locations, and these locations may be different from the install path of the tool and/or the location from which the tool is being run. Therefore, location 206 of an entry 208 specifies the heap dump location for heap dumps by the tool indicated in the entry. For instance, in FIG. 2, the Eclipse Platform has a heap dump location of "C:\Eclipse" (see entry 202a), while the WebSphere® Business Modeler has a heap dump location of "C:\Program Files\IBM\WBModeler" (see entry 202b).

Additionally, the entries in the registry each include a process identifier (PID) field 208. In modern operating system, upon commencing execution of a tool, the executing tool is assigned a PID, typically by a kernel of the operating system. Each assigned PID is unique in that no two tools executing at the same time share the same PID. For tools for which startup and shutdown events are being tracked (explained in further detail below), the PID of a tool, upon commencing execution thereof, is written into the heap dump location registry, and particularly into the PID field of the entry corresponding to the tool. Then, upon termination of execution of the tool, the PID field in the entry is cleared.

Registry 200 also includes an execution status indicator 210. Upon commencing execution of a tool, the execution status indicator in the entry 202 for the tool can be set to indicate that the tool is currently executing. Upon normal termination of execution of the tool, the execution status indicator is set to indicate that the tool is no longer currently executing. In one embodiment, True and False (or "1" and "0") indicators are used to indicate that the tool is currently executing, and that the tool is no longer currently executing, respectively.

The PID field and execution status indicator for an entry may or may not be used when detecting heap dump occurrence, in accordance with one or more aspects of the present invention, depending on whether a heap dump tracker is incorporated into the particular tool. Consequently, two approaches to heap dump occurrence detection are described below, one approach which utilizes the PID field and execution status indicator, for those tools incorporating the heap dump tracker, and another approach that does not use these two fields.

Heap dump location registry 200 additionally includes a heap dump occurrence indicator 212 for each entry. The heap dump occurrence indicator is set to either True or False, in this example, to indicate occurrence of a heap dump for the tool. When an entry's heap dump occurrence indicator is set to True, it indicates that a heap dump has occurred and been detected for the tool associated with that entry. When an entry's heap dump occurrence indicator is set to False, or is cleared, it indicates that no heap dump has been detected for the tool associated with that entry since it was last set to False, or cleared, as the case may be.

Thus, registry 200 maintains heap dump locations of various tools installed on the computer. The registry has flags to indicate the execution status and heap dump occurrence status for the tools registered in the entries of the registry. For tools that include a heap dump tracker (explained further below), the execution status is updated during launch and normal shutdown of the tools, and a PID field stores a process identifier of the launched tool, which PID will be set during launch, and cleared during normal shutdown of the tool. Registry 200 can be implemented in text file, XML file, or database, as examples. In one example, the registry is maintained in one or more database tables. Also, note that the table depicted in FIG. 2 is just one example for illustration purposes only, and that actual implementation may vary depending on the circumstances, as will be appreciated by those having ordinary skill in the art.

Figure 3:
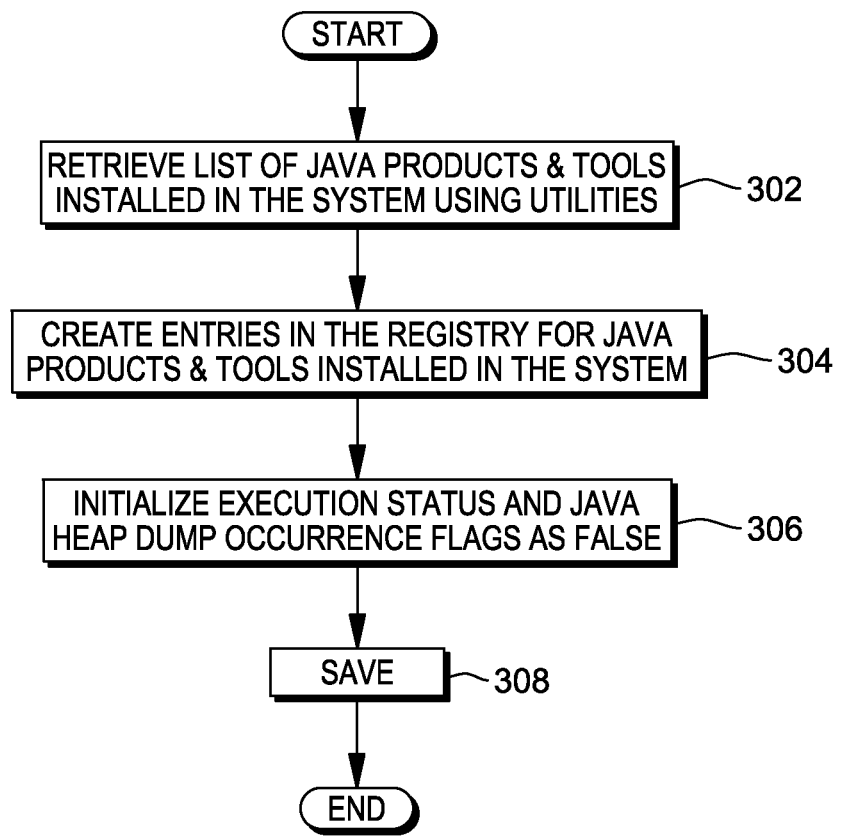
FIG. 3 depicts one example of a process for initializing a heap dump location registry, in accordance with one or more aspects of the present invention.

At some point the heap dump location registry is created via an initialization process. FIG. 3 depicts one example of a process for initializing a heap dump location registry, in accordance with one or more aspects of the present invention. First, a list of Java (in this example) tools installed on the system is retrieved (302). In one embodiment, this is facilitated through the use of system-provided utilities or other analysis tools that help identify such tools installed on the system. Next, an entry is created in the registry for each of the Java tools installed (304), to register the tool in the heap dump location registry for heap dump occurrence detection. The execution status and heap dump occurrence flags are both set as false (306), and then the registry is saved (308) as one or more text file, XML file, or, for instance. In one example, after the registry is initialized, the registry can be displayed in a user interface for a user to manually verify that the proper tools and their heap dump locations were registered correctly in the registry.

The above process or portions thereof can be performed automatically, in one example. For instance, an analysis tool of the operating system could examine and/or analyze the system, for instance the contents of storage devices thereof and/or the tools installed thereon, to identify tools for which heap dump occurrence detection is possible, and then automatically create the heap dump location registry with the appropriate entries for those tools.

The process of FIG. 3 can also be performed periodically to update the heap dump location registry in order to ensure that the registry incorporates the most up-to-date list of tools installed on the system for which heap dump occurrence detection is to be provided. In performing the process periodically to update the registry, the process of FIG. 3 will be slightly varied in that that entries can be added for newly detected tools, entries can be deleted for tools no longer detected as installed, and entries associated with tools which are already registered in the registry can remain unchanged.

Additionally, a user interface can be provided to display the heap dump location registry to facilitate viewing and/or editing of the registry by a user. The user interface can provide a facility that enables a user to add, remove and/or modify registry entries corresponding to the tools installed on the data processing system, should manual modification be desired. Additionally, by making the heap dump location registry readily viewable to a user, the user can easily, and on-demand, determine whether heap dump(s) have occurred for the various tools by displaying the registry and checking the heap dump occurrence indicator(s) therein. In one example, to prevent potentially detrimental modification to the heap dump location registry, the user interface can be configured to alternatively provide a form view (read-write) of the registry or a list view (read-only) of the registry, for the user.

As noted, the process of FIG. 3 could be performed automatically in one example. In another example, one or more of the activities of FIG. 3 can be performed by a user. For instance, a user could create the registry by retrieving/creating the list of tools, creating an entry in the registry for each tool, and/or initializing the execution status and heap dump occurrence flags as being false.

Figure 4:
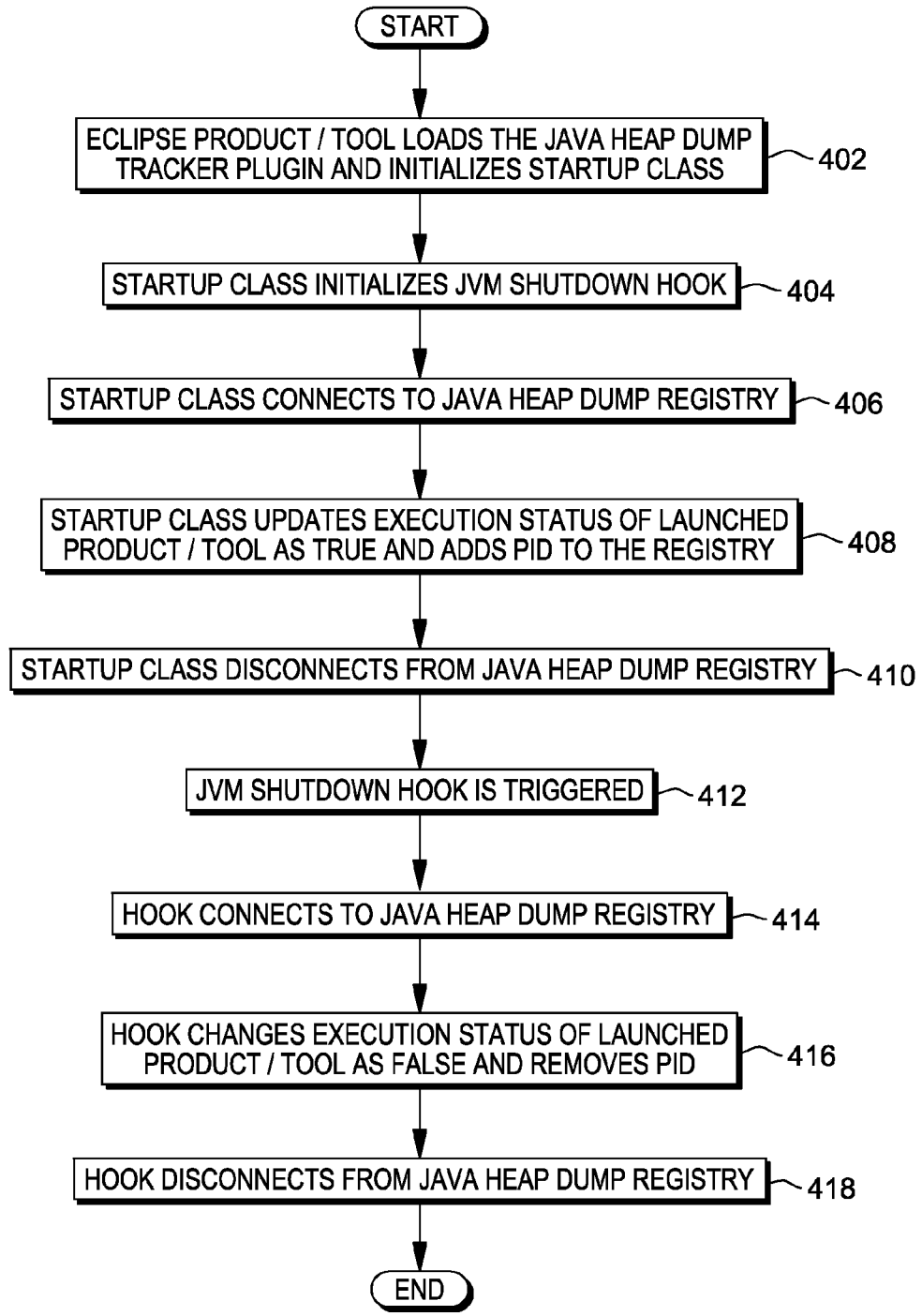
FIG. 4 depicts one example of a process for tracking startup and shutdown events of one or more tools, in accordance with one or more aspects of the present invention.

Some Java tools can incorporate a heap dump tracker to facilitate tracking Java virtual machine (JVM) startup and shutdown events. Some Java tools are based on the Eclipse platform, which is a multi-language software development environment. The Eclipse platform can be extended using plug-ins to create Eclipse-based Java tools that run on JVMs. In accordance with an aspect of the present invention, for Eclipse-based tools, a heap dump tracker can be included in an Eclipse plug-in which has a Startup class that is triggered during tool launch and which registers a shutdown hook to track a JVM shutdown event of the tool. Additionally, new, non-Eclipse based tools can also be programmed with the heap dump tracker, specifically in their Java class, to facilitate tracking JVM startup and shutdown. FIG. 4 depicts one example of a process for tracking startup and shutdown events of a tool incorporating the heap dump tracker, in accordance with one or more aspects of the present invention. In FIG. 4, the tool is an Eclipse-based tool with the heap dump tracker included in an Eclipse plug-in (e.g. in a Startup class of the plug-in), however the process is the same for new, non-Eclipse based tools which can be programmed to include the heap dump tracker in the Java class.

The process of FIG. 4 begins with the tool loading a heap dump tracker plug-in to initialize the Startup class (402). In one example, this occurs responsive to launch of the tool, for instance tool launch by a user. Next, the Startup class initializes/registers a JVM shutdown hook (404), which will be used to track the occurrence of a JVM shutdown event. Registration of the hook will cause the hook to be triggered upon normal shutdown of the tool. The Startup class then connects to (e.g. opens or accesses) the heap dump location registry (406) and updates the execution status indicator in the entry of the launched tool to indicate that the tool is currently executing (408). In this example, the indicator is set to True. Additionally, the startup class adds the PID of the tool to the registry (408), more particularly to the PID field in the entry for the launched tool. The startup class then disconnects from the heap dump location registry (410). At some point when the JVM shutdown hook is triggered (412), for instance, responsive to a user selecting to exit the tool, the JVM shutdown hook will connect to the heap dump location registry (414) and change the execution status indicator of the launched tool to indicate termination of execution of the tool (e.g. set to False), and remove the PID (416). The JVM shutdown hook then disconnects from the heap dump location registry (418), and the process ends.

The process of FIG. 4 for tracking startup and shutdown of Eclipse-based, and new, non-Eclipse-based tools facilitates not only maintaining the heap dump location registry with updated execution status of the one or more tools, but also the detection of abnormal termination and heap dump occurrence of Java tools installed on the system. The process above will complete when a tool terminates normally. However, the shutdown hook will not be triggered when abnormal termination of the tool occurs, thereby causing the execution status indicator for the tool in the heap dump location registry to incorrectly identify the tool as currently executing. Furthermore, the PID will remain in the heap dump location registry, even though the process having the PID (i.e. the tool) is terminated and therefore not currently executing on the system. Thus, it is the updating of the registry via the shutdown hook, as described above with reference to FIG. 4, that is used to reflect current execution status and PID of the tool. From this, identification of tools that have terminated abnormally and created a heap dump is facilitated through a process described in further detail with reference to FIG. 5.

Figure 5:
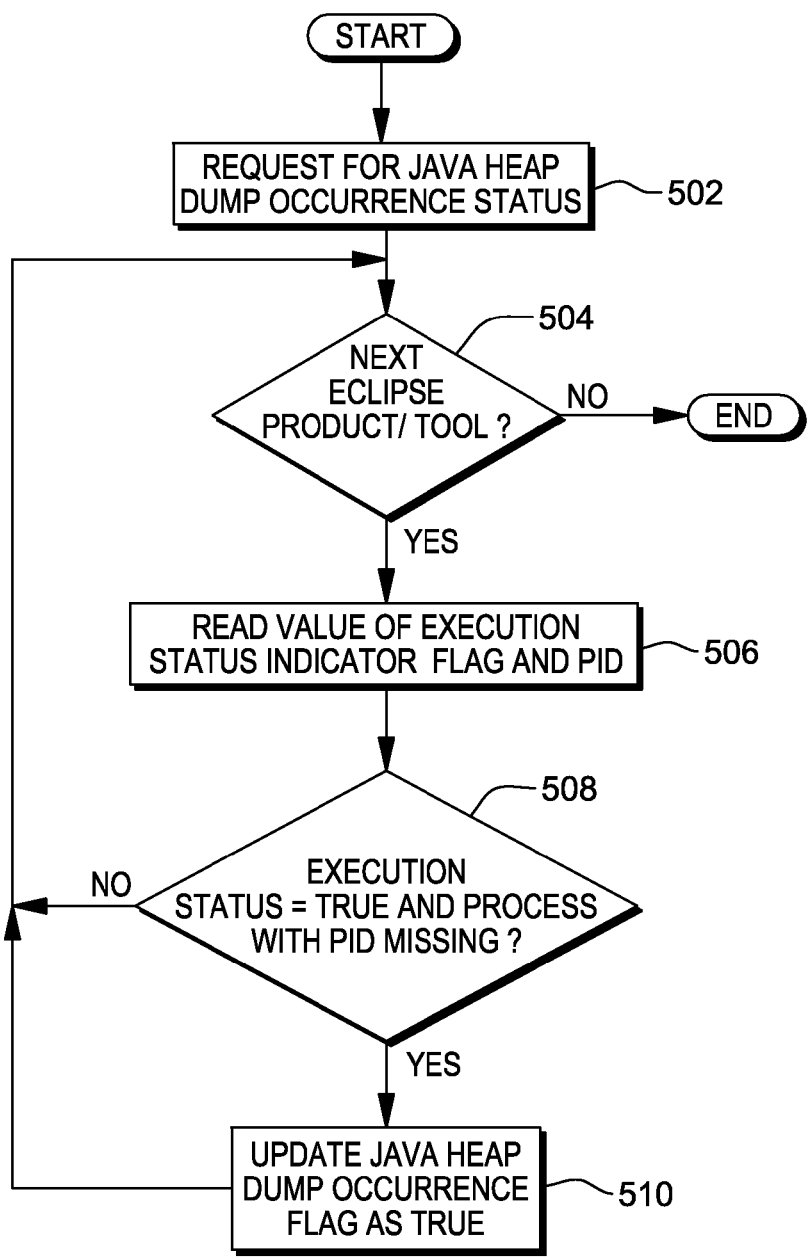
FIG. 5 depicts one example of a process for detecting heap dump occurrence for one or more tools, in accordance with one or more aspects of the present invention.

FIG. 5 depicts one example of a process for detecting heap dump occurrence for one or more tools, in accordance with one or more aspects of the present invention. The process is used to detect heap dump occurrence in tools for which startup and shutdown events are tracked. The process of FIG. 5 is directed to detection of heap dump occurrence in Eclipse-based tools, but can be used to detect heap dump occurrence in any tools for which startup and shutdown events are tracked, for instance not only Eclipse-based tools but also new, non-Eclipse-based tools into which the heap dump tracker is incorporated into the Java class. In one example, a daemon thread or process can execute on the system and periodically verify heap dump occurrence of the registered tools. For instance, the daemon can trigger the process of FIG. 5 at pre-defined intervals of time to request heap dump occurrence status (502). Additionally, or alternatively, a user can trigger the process to detect heap dump occurrence status. After the request for heap dump occurrence status is triggered, the process determines whether a next Eclipse-based tool exists in the registry for which heap dump occurrence is to be checked (504). In one example, a separate flag or indicator is maintained in the heap dump registry to identify and/or distinguish between Eclipse-based tools and other tools. If no next Eclipse-based tool exists, the process ends. If, instead, a next tool exists, the value of the execution status indicator is read, as is the PID that is indicated in the registry for the tool (506). Next, it is determined whether the execution status indicates that the tool is currently executing (e.g. execution status=True?) and whether the PID indicated in the registry matches the PID of any currently executing tool (508). When execution status is indicated as true, the absence of a process having the PID indicated in the registry will be considered an indication of heap dump occurrence for the tool. The heap dump occurrence flag will then be updated (i.e. set to True) (510). The process again determines whether a next Eclipse-based tool exists in the registry for which heap dump occurrence is to be checked (504), and continues as above.

Non-Eclipse-based tools can be either existing non-Eclipse-based tools, or new (to be released) tools not based on Eclipse. As noted, the process of FIG. 5 accounts for the latter scenario, in which heap dump occurrence is detected in new, non-Eclipse-based Java tools. In the case of these tools, the heap dump tracker will be added to the new, non-Eclipse Java tool in the Java Class. Then, as above, the Java class will be triggered during launch of the tool, will update, responsive to a JVM startup event, the execution status indicator and PID of the tool in the heap dump location registry, and register the JVM shutdown hook so that normal JVM shutdown can be reflected via an update to the execution status indicator in the heap dump location registry. The process of FIG. 5, therefore, will provide detection of heap dump occurrence for these new, non-Eclipse-based tools.

For certain existing tools that are not Eclipse-based, an alternative process (FIG. 6) is provided for detecting heap dump occurrence, in accordance with one or more aspects of the present invention. This process can be used to detect heap dump occurrence in existing non-Eclipse-based Java tools which do not incorporate startup and shutdown event tracking, for instance tracking via a heap dump tracker described above. In other words, JVM startup and shutdown events are not being tracked in the heap dump location registry for these tools.

Figure 6:
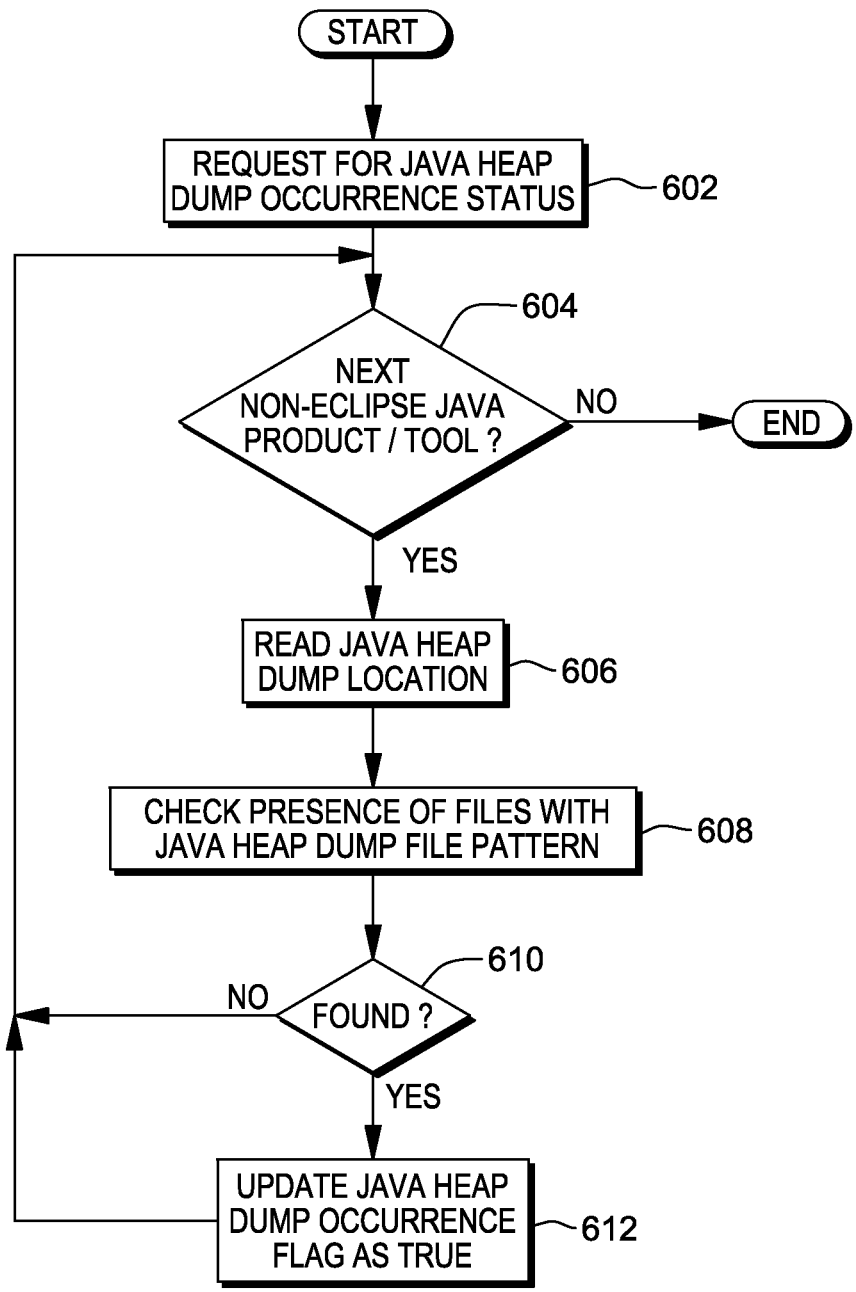
FIG. 6 depicts another example of a process for detecting heap dump occurrence for one or more tools, in accordance with one or more aspects of the present invention.

In the approach of FIG. 6, a daemon thread or process, such as the same daemon thread or process performing the process of FIG. 5, or a different daemon thread or process, can execute on the system and periodically verify potential heap dump occurrence of the registered tools. For instance, the daemon can initiate the process of FIG. 6 at pre-defined intervals of time to request heap dump occurrence status (602). Additionally, or alternatively, a user can trigger the process to detect heap dump occurrence. Responsive to the request for heap dump occurrence status, the process determines whether a next non-Eclipse-based Java tool exists in the registry for which heap dump occurrence is to be checked (604). As noted above, in one example, this is facilitated by way of a separate flag or indicator which can be maintained in the heap dump registry to identify and/or distinguish between Eclipse-based tools and other (e.g. non-Eclipse-based) tools. If no next non-Eclipse-based tool exists, the process ends. If, instead, a next tool does exist, the location to which heap dumps of the tools are written is obtained from the registry (i.e. location 206 in the appropriate entry) (606) and that location is then checked with heap dump file patterns (explained further below) for the presence of one or more heap dump files (608). If one or more heap dump files are found in that location (610), the heap dump occurrence flag will be updated (i.e. set to True) (612). The process again determines whether a next Eclipse-based tool exists in the registry for which heap dump occurrence is to be checked (604), and continues as above.

Thus, in this example, the registered heap dump location for each of the tools is obtained from the registry and the specific locations are checked for the presence of heap dump files. In one example, the presence of heap dump files in a file location is checked based on file patterns of heap dump files. Examples of such heap dump file patterns include, but are not limited to, core.*.dmp, heapdump.*.phd, and javacore.*.txt. As those having ordinary skill in the art recognize, * symbolizes a wildcard character that can represent any string of characters. Thus, any file having filename beginning with "core." and ending in ".dmp" will be considered a match to the pattern core.*.dmp. The existence of files matching a heap dump file pattern is considered to be an indication of heap dump occurrence for the tool.

In one embodiment, the processes of FIGS. 5 and 6 are both performed, perhaps by a common thread or process, or by a separate thread or process, in order to trace heap dump occurrence in both types of tools installed on the system. In this regard, the system can identify and distinguish between those tools for which the execution status/PID approach is to be used (FIG. 5), and those tools for which the heap dump file pattern approach (FIG. 6) is to be used. In one example, the tools are distinguished based on an indicator in the heap dump location registry that is used to indicate which approach is to be used for the tool.

The system may periodically (e.g. by way of a daemon process or scheduled process), initiate a cleanup of one or more heap dump locations. When it is indicated in the registry that one or more heap dumps have occurred, the process can, for instance, notify a user about the heap dump occurrence, copy the heap dump files to another location, and/or automatically remove the heap dump files in the locations indicated in the registry, to avoid the proliferation of unnecessary heap dump files.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
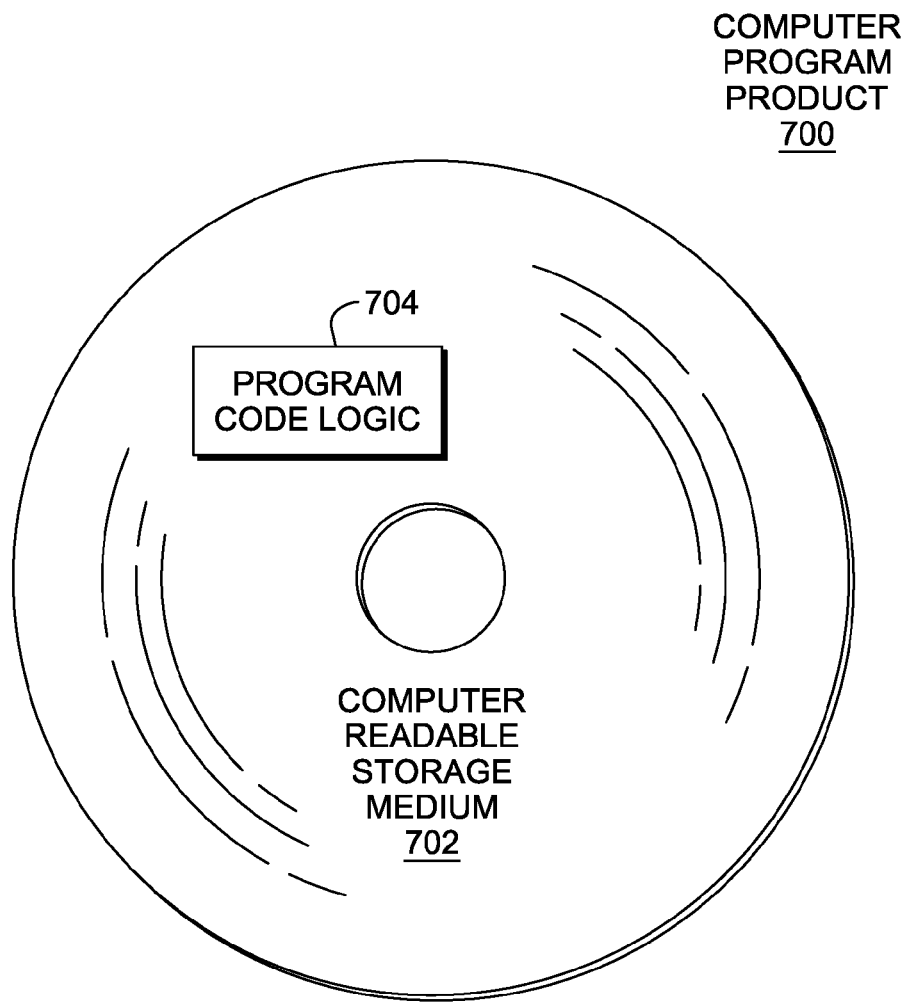
FIG. 7 depicts one example of a computer program product incorporating one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method comprising:
   maintaining, by a processor, a heap dump location registry, the heap dump location registry indicating one or more tools for which heap dump occurrence is to be detected and comprising one or more registrations of one or more heap dump locations for heap dumps of the one or more tools; and
   subsequent to occurrence of a heap dump of a tool of the one or more tools, detecting occurrence of the heap dump of the tool, the detecting comprising periodically referencing the heap dump location registry and determining, based on the referencing, whether the heap dump has occurred for that tool.

2. The method of claim 1, wherein the maintaining comprises tracking execution status of the one or more tools to maintain updated execution status of the one or more tools in the heap dump location registry, the tracking execution status facilitating identifying abnormal termination of the one or more tools, the abnormal termination indicative of heap dump occurrence.

3. The method of claim 2, wherein the tracking comprises tracking startup and shutdown events of the one or more tools, wherein responsive to commencing execution of one tool of the one or more tools, a shutdown hook of the one tool is initialized and an execution status indicator for the one tool in the heap dump location registry is updated to indicate execution of the one tool, and wherein responsive to termination of execution of the one tool, the shutdown hook is triggered to update the execution status indicator for the one tool to indicate termination of execution of the one tool.

4. The method of claim 1, wherein the maintaining comprises, responsive to commencing execution of the tool:
   updating an execution status indicator for the tool to indicate in the heap dump location registry that execution of the tool has commenced; and
   adding a process identifier of the tool to the heap dump location registry.

5. The method of claim 4, wherein the periodically referencing the heap dump location registry comprises:
   periodically checking the execution status indicator for the tool and the process identifier of the tool in the heap dump location registry to determine whether the execution status indicator for the tool is set to true, indicating that the tool is executing, and whether the process identifier of the tool is associated with any currently executing process; and
   responsive to determining that the execution status indicator for the tool is set to true and that the process identifier of the tool is not associated with any currently executing process, determining that the heap dump has occurred for the tool.

6. The method of claim 1, wherein the periodically referencing the heap dump location registry comprises:
   obtaining, from a registration of the one or more registrations, a heap dump location for heap dumps of the tool; and
   checking the heap dump location for the presence of one or more heap dump files.

7. The method of claim 6, wherein heap dump files of the tool are written according to one or more heap dump file patterns, wherein the checking the heap dump location comprises checking for the presence of one or more files matching at least one of the one or more heap dump file patterns.

8. The method of claim 7, wherein the method further comprises, responsive to one or more files matching the one or more heap dump file patterns being present in the heap dump location, determining that the heap dump has occurred for the tool.

9. The method of claim 1, wherein the method further comprises, responsive to determining that the heap dump has occurred for the tool, setting a heap dump occurrence flag in the heap dump location registry to indicate that heap dump has occurred for that tool.

10. The method of claim 9, wherein the method further comprises initiating cleanup of the one or more heap dump locations, wherein heap dump files in heap dump locations of tools for which heap dump occurrence is indicated in the heap dump location registry as having occurred are deleted from their respective heap dump locations specified in the heap dump location registry.

11. A computer system comprising:
   a memory; and
   a processor, in communications with the memory, wherein the computer system is configured to perform a method comprising:
      maintaining a heap dump location registry, the heap dump location registry indicating one or more tools for which heap dump occurrence is to be detected and comprising one or more registrations of one or more heap dump locations for heap dumps of the one or more tools; and
      subsequent to occurrence of a heap dump of a tool of the one or more tools, detecting occurrence of the heap dump of the tool, the detecting comprising periodically referencing the heap dump location registry and determining, based on the referencing, whether the heap dump has occurred for that tool.

12. The computer system of claim 11, wherein the maintaining comprises tracking execution status of the one or more tools to maintain updated execution status of the one or more tools in the heap dump location registry, the tracking execution status facilitating identifying abnormal termination of the one or more tools, the abnormal termination indicative of heap dump occurrence, wherein the tracking comprises tracking startup and shutdown events of the one or more tools, wherein responsive to commencing execution of one tool of the one or more tools, a shutdown hook of the one tool is initialized and an execution status indicator for the one tool in the heap dump location registry is updated to indicate execution of the one tool, and wherein responsive to termination of execution of the one tool, the shutdown hook is triggered to update the execution status indicator for the one tool to indicate termination of execution of the one tool.

13. The computer system of claim 11, wherein the maintaining comprises, responsive to commencing execution of the tool:
  updating an execution status indicator for the tool to indicate in the heap dump location registry that execution of the tool has commenced; and
  adding a process identifier of the tool to the heap dump location registry.

14. The computer system of claim 13, wherein the periodically referencing comprises:
  periodically checking the execution status indicator for the tool and the process identifier of the tool in the heap dump location registry to determine whether the execution status indicator for the tool is set to true, indicating that the tool is executing, and whether the process identifier of the tool is associated with any currently executing process; and
  responsive to determining that the execution status indicator for the tool is set to true and that the process identifier of the tool is not associated with any currently executing process, determining that the heap dump has occurred for the tool.

15. The computer system of claim 11, wherein the periodically referencing the heap dump location registry comprises:
  obtaining, from a registration of the one or more registrations, a heap dump location for heap dumps of the tool; and
  checking the heap dump location for the presence of one or more heap dump files.

16. The computer system of claim 15, wherein heap dump files of the tool are written according to one or more heap dump file patterns, wherein the checking the heap dump location comprises checking for the presence of one or more files matching at least one of the one or more heap dump file patterns.

17. The computer system of claim 16, wherein the method further comprises, responsive to one or more files matching the one or more heap dump file patterns being present in the heap dump location, determining that the heap dump has occurred for the tool.

18. A computer program product comprising:
  at least one non-transitory medium readable by a processor and storing instructions for execution by a processor to perform a method comprising:
    maintaining a heap dump location registry, the heap dump location registry indicating one or more tools for which heap dump occurrence is to be detected and comprising registrations of heap dump locations for heap dumps of the one or more tools; and
    subsequent to occurrence of a heap dump of a tool of the one or more tools, detecting occurrence of the heap dump of the tool, the detecting comprising periodically referencing the heap dump location registry and determining, based on the referencing, whether the heap dump has occurred for that tool.

19. The computer program product of claim 18, wherein the maintaining comprises, responsive to commencing execution of the tool, updating an execution status indicator for the tool to indicate in the heap dump location registry that execution of the tool has commenced, and adding a process identifier of the tool to the heap dump location registry, and wherein the periodically referencing the heap dump location registry comprises:
  periodically checking the execution status indicator for the tool and the process identifier of the tool in the heap dump location registry to determine whether the execution status indicator for the tool is set to true, indicating that the tool is executing, and whether the process identifier of the tool is associated with any currently executing process; and
  responsive to determining that the execution status indicator for the tool is set to true and that the process identifier of the tool is not associated with any currently executing process, determining that the heap dump has occurred for the tool.

20. The computer program product of claim 18, wherein the periodically referencing the heap dump location registry comprises:
  obtaining, from a registration of the one or more registrations, a heap dump location for heap dumps of the tools;
  checking the heap dump location for the presence of one or more heap dump files, wherein heap dump files of the tool are written according to one or more heap dump file patterns, wherein the checking the heap dump location comprises checking for the presence of one or more files matching at least one of the one or more heap dump file patterns; and
  responsive to one or more files matching the one or more heap dump file patterns being present in the heap dump location, determining that the heap dump has occurred for the tool.

* * * * *